United States Patent
Kemnitz et al.

(10) Patent No.: US 7,533,649 B2
(45) Date of Patent: May 19, 2009

(54) PISTON FOR AN INTERNAL COMBUSTION ENGINE

(75) Inventors: Peter Kemnitz, Leutenbach (DE); Alexander Grössle, Ittlingen (DE)

(73) Assignee: MAHLE International GmbH, Stuttgart (DE)

( * ) Notice: Subject to any disclaimer, the term of this patent is extended or adjusted under 35 U.S.C. 154(b) by 190 days.

(21) Appl. No.: 11/821,025

(22) Filed: Jun. 21, 2007

(65) Prior Publication Data

US 2008/0245335 A1   Oct. 9, 2008

(30) Foreign Application Priority Data

Apr. 5, 2007   (DE)   ................. 10 2007 016 945

(51) Int. Cl.
  *F02F 3/00*   (2006.01)
(52) U.S. Cl. .................................................. 123/193.6
(58) Field of Classification Search ............. 123/193.6; 92/211, 222, 186
  See application file for complete search history.

(56) References Cited

U.S. PATENT DOCUMENTS

| | | | | |
|---|---|---|---|---|
| 3,413,897 A | * | 12/1968 | Atkin | .................. 92/186 |
| 4,008,051 A | * | 2/1977 | Cadle | ................. 428/553 |
| 4,138,984 A | * | 2/1979 | Steidle et al. | ............. 123/193.6 |
| 4,292,936 A | * | 10/1981 | Morishita et al. | ......... 123/193.6 |
| 4,383,509 A | * | 5/1983 | Bauer | ....................... 123/193.6 |
| 4,987,866 A | | 1/1991 | Mielke et al. | |
| 5,505,171 A | * | 4/1996 | Gazzard | .................. 123/193.6 |
| 5,671,710 A | * | 9/1997 | Sasaki | ...................... 123/193.6 |
| 5,979,298 A | * | 11/1999 | Whitacre | ..................... 92/211 |
| 2008/0314241 A1 | * | 12/2008 | Buschbeck et al. | ............ 92/222 |

FOREIGN PATENT DOCUMENTS

DE   39 08 810 A1   9/1990

OTHER PUBLICATIONS

Material Specification Sheet for Aluminum Alloy, MAHLE 142, pp. 1-5.
Material Specification Sheet for Aluminum Alloy, M174+, pp. 1-6.

* cited by examiner

*Primary Examiner*—M. McMahon
(74) *Attorney, Agent, or Firm*—Collard & Roe, P.C.

(57) ABSTRACT

A piston for an internal combustion engine, comprising a piston head having a piston crown, a circumferential top land, and a circumferential ring belt having ring grooves. At least one ring groove is provided with a ring insert. A circumferential depression is provided in the top land, above the ring belt.

11 Claims, 1 Drawing Sheet

PISTON FOR AN INTERNAL COMBUSTION ENGINE

BACKGROUND OF THE INVENTION

1. Field of the Invention

The present invention relates to a piston for an internal combustion engine, having a piston head with a piston crown, a circumferential top land, and a circumferential ring belt having ring grooves.

2. The Prior Art

Pistons for internal combustion engines are exposed to significant stresses during operation. In particular, the piston crown, the top land, and the piston ring that lies directly adjacent to the top land, including the ring groove that accommodates it, are exposed to particular mechanical and thermal stresses.

For this reason, the ring groove that lies adjacent to the top land is preferably provided with a ring insert. As a rule, the ring insert consists of an austenitic cast iron with lamellar graphite. These materials are also known under the name of NiResist materials. Such a ring insert is laid into the casting mold before a piston for an internal combustion engine is cast, and surrounded with the casting material. In the production of pistons from an aluminum alloy, the ring insert must be pre-treated, so that a bonding layer between the ring insert materials and the piston material is formed. For this purpose, the ring insert is generally Alfin-bonded, for example dipped into an aluminum/silicon melt, thereby forming a so-called Alfin layer, consisting of iron aluminides. This Alfin layer represents the desired bonding layer between the piston material and the ring insert materials.

This bonding layer is relatively rigid. Due to the special mechanical and thermal stresses that proceed from the combustion gases formed during ignition of the gaseous fuel/air mixture, there is therefore the risk that due to the mechanical stresses within the piston head, the bonding layer between the piston material and the ring insert materials will be subject to such great stress that the resulting tensile stress within the bonding layer will cause tearing of this layer. This causes the ring insert to loosen in the ring groove, and this, in the final analysis, results in engine damage.

The German Publication DE 39 08 810 A1 describes a piston for an internal combustion engine whose piston head is provided, below the ring belt, with two dead-end holes that run inward from the mantle of the piston skirt and extend parallel to the pin axis direction. In this way, the flow of force is guided into the width, in other words into the regions to the left and the right of the dead-end holes.

The circumstance that mechanical weakening of the piston head can take place due to the production of the dead-end holes is problematic in this connection.

SUMMARY OF THE INVENTION

It is therefore an object of the invention to provide a piston for an internal combustion engine, in which the risk of tearing of the bonding layer between ring insert and piston material is reduced, without any risk of mechanical weakening of the piston head.

This object is accomplished by a piston for an internal combustion engine, having a piston head with a piston crown, a circumferential top land, and a circumferential ring belt having ring grooves. At least one of the ring grooves is provided with a ring insert, and a circumferential depression is provided in the top land, above the ring belt.

The configuration of the piston according to the invention has the result that the depression is compressed under the effect of the stress that proceeds from the combustion gases. As a result, the forces that act during the ignition process are essentially absorbed by the piston head, and no longer reach the ring insert, or reach it only in weakened form, thereby significantly reducing the stress on the bonding layer. The depression provided according to the invention therefore represents a type of stress-relief groove for reducing stress. It results in a reduction of movements within the piston head, so that the tensile stresses that occur in the bonding layer situated between the ring insert and the piston material are significantly reduced. The depression can furthermore be produced in a simple and cost-advantageous manner, and can easily be worked in while the piston head is being lathed into its finished form.

The depth of the depression represents a compromise between the stress reduction being aimed at, and weakening of the piston head. The depth can therefore vary, depending on the piston materials used, the dimensions of the piston, in each instance, and the conditions of use. It has turned out that an average depth (t) of the circumferential depression provided according to the invention of up to 1 mm represents a useful compromise, in a standard case.

For the same reasons, the shape of the depression provided according to the invention can also vary, depending on the conditions of use, the dimensions, and the individual stresses on the piston. A depression that is V-shaped (if applicable, with a rounded bottom), or has a parabolic or hyperbolic shape, in cross-section, has proven to be particularly well suited for the present invention.

If a depression configured in V shape or in the shape of a parabola or hyperbola, in cross-section, is present, its opening angle (a) is also determined by the general conditions indicated above. An opening angle (a) of up to 20° has proven to be practical.

If the ring groove that lies directly adjacent to the top land is provided with a ring insert, it is practical to make the depression at the smallest possible distance from the ring insert, but without touching the insert. A distance (d) between the circumferential depression and the ring insert of at least 1 mm is recommended.

At least the piston head of the piston according to the invention is generally produced from a known light-metal alloy, preferably an aluminum alloy. Aluminum alloys of the type MAHLE M142 or MAHLE M174 are particularly practical. These alloys have a microstructure of granular phosphorous Al—Si eutectic with primary silicon crystals and finely distributed intermetallic phases. The alloys have the following composition:

| Element | M142 wt. % | M174 wt % |
|---|---|---|
| Si | 11-13 | 11-13 |
| Cu | 2.5-4 | 3.0-5.0 |
| Mg | 0.5-1.2 | 0.5-1.2 |
| Ni | 1.75-3.0 | 1.0-3.0 |
| Ti | 0.05-0.2 | max 0.2 |
| Zr | 0.05-0.2 | max 0.2 |
| V | 0.05-0.18 | max 0.18 |
| Fe | max 0.7 | max 0.7 |
| Mn | max 0.3 | max 0.3 |
| Zn | max 0.3 | max 0.3 |
| Cr | max 0.05 | max 0.05 |
| Pb | max 0.05 | max 0.05 |
| Sn | max 0.05 | max 0.05 |
| Ca | max 0.01 | max 0.01 |

-continued

| Element | M142 wt. % | M174 wt % |
|---|---|---|
| others together | max 0.05 max 0.15 | max 0.05 max 0.15 |
| Al | balance | balance |

The ring insert is generally produced from one of the known NiResist materials.

Finally, the ring insert can have a ring insert part and a cooling channel part, in known manner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
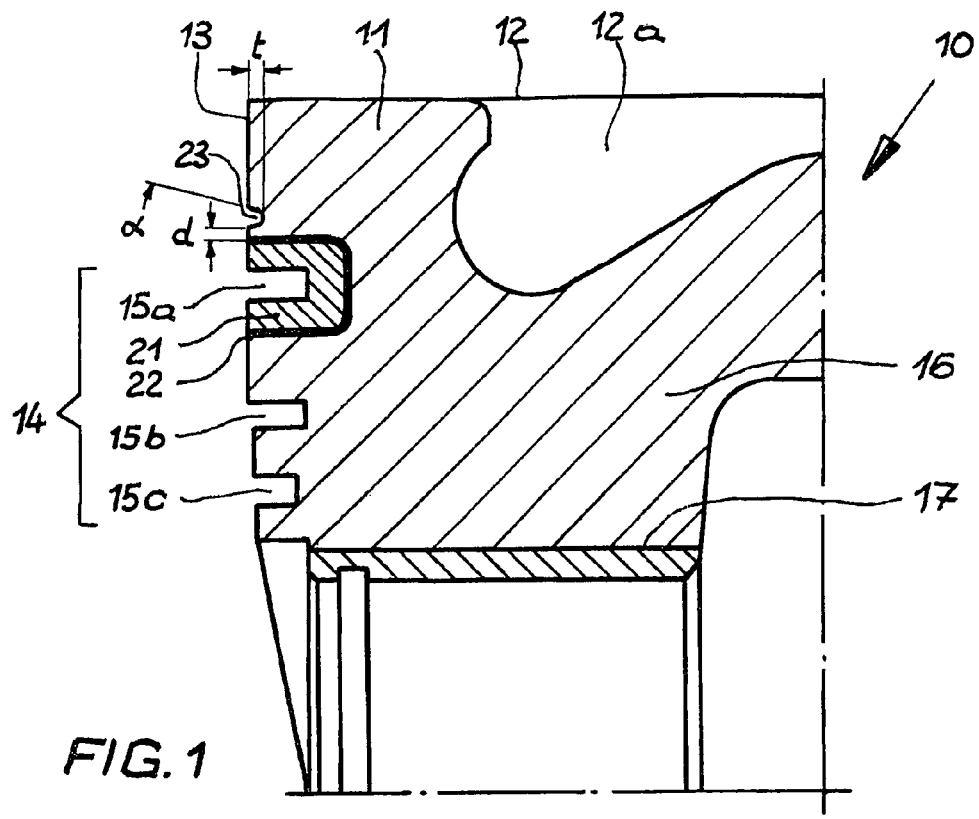
FIG. 1 shows a first exemplary embodiment of a piston according to the invention, in a sectional partial representation.

Referring now in detail to the drawings, FIG. 1 shows a first exemplary embodiment of a piston 10. Piston 10 can be of any desired construction, both one-part and two-part, for example as a composite piston or articulated piston. Piston 10, in known manner, has a piston head 11 having a piston crown 12 provided with a combustion bowl 12a, as well as a circumferential top land 13 and a circumferential ring belt 14 having ring grooves 15a, 15b, 15c. Piston head 11 is furthermore connected, in known manner, with pin bosses (not shown), which have pin boss bores 17 for accommodating a piston pin, not shown, by way of pin boss connections 16. Piston 10 furthermore, in known manner, has a piston skirt having working surfaces (not shown). In the exemplary embodiment, at least piston head 11 is made from a known aluminum alloy, for example an aluminum/silicon alloy of the type MAHLE M172 or MAHLE M174.

In the exemplary embodiment, a ring insert 21 is provided directly below top land 13, into which insert ring groove 15a that lies directly adjacent to top land 13 is worked. In the exemplary embodiment, ring insert 21 consists of a NiResist material, in other words of an austenitic cast iron material with lamellar graphite. Ring insert 21 is alfinated, i.e., provided with a so-called Alfin layer consisting of iron aluminides, along its surface that faces piston head 11. The Alfin layer serves as a bonding layer 22 between ring insert 21 and piston head 11.

The comparatively rigid bonding layer 22 is subjected to great stresses during operation of the internal combustion engine, which stresses essentially derive from the strong tensile stresses that occur in bonding layer 22 itself. To relieve the stress on bonding layer 22, a circumferential depression 23 is worked into top land 13. Circumferential depression 23 is configured approximately in V shape in cross-section, and has a rounded bottom. However, circumferential depression 23 can also be configured in parabola or hyperbola shape. In the exemplary embodiment, circumferential depression 23 has a depth (t) of about 1 mm, as well as an opening angle (a) of about 20°. In the exemplary embodiment, the distance (d) between circumferential depression 23 and the ring insert 21 is about 1 mm.

During each ignition process of the internal combustion engine, circumferential depression 23 is compressed under the effect of the stress acting on piston crown 12 and top land 13. As a result, the forces that act during the ignition process are essentially absorbed by piston head 11, and no longer reach ring insert 21, or reach it only in weakened form, so that bonding layer 22 is significantly relieved of stress. The circumferential depression 23 therefore represents a type of stress-relief groove for reducing stress in the region of the ring insert 21. It results in a reduction in the movements within piston head 11, so that the tensile stresses that occur in the bonding layer 22 situated between ring insert 21 and the piston material are significantly reduced. Circumferential depression 23 is simply worked in during the known lathing of piston head 11 to produce its finished form.

Figure 2:
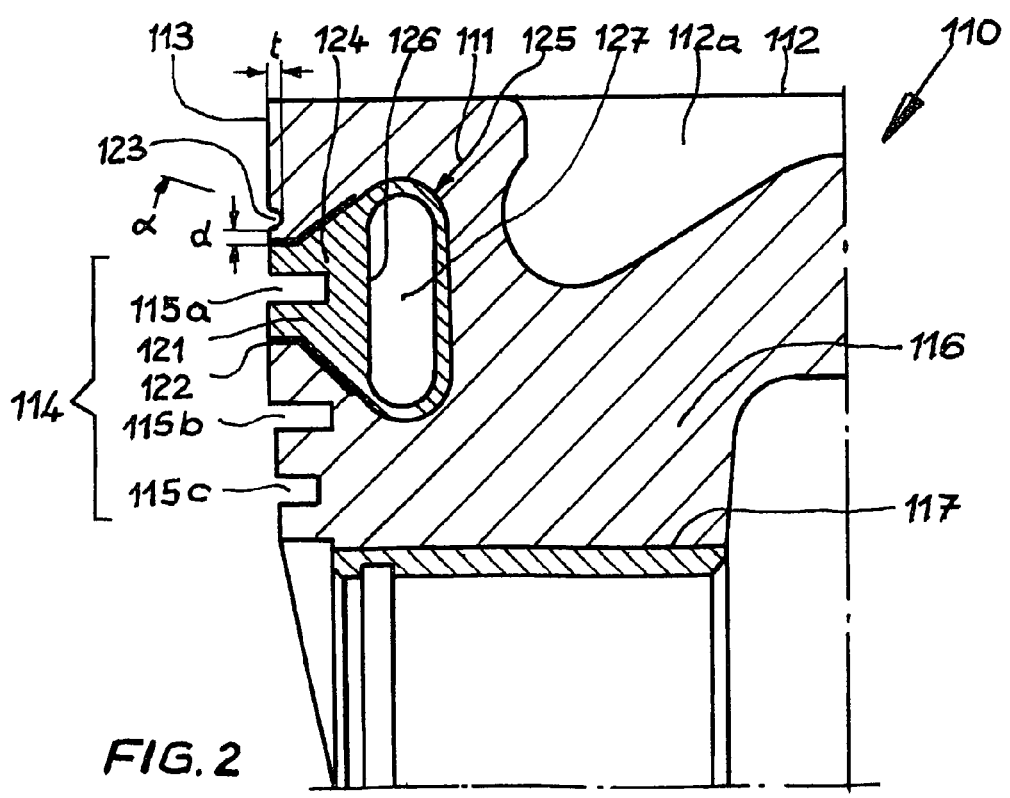
FIG. 2 shows another exemplary embodiment of a piston according to the invention, in a sectional partial representation.

FIG. 2 shows another exemplary embodiment of a piston 110. Piston 110 essentially corresponds to piston 10 shown in FIG. 1. Piston 110 also has a piston head 111 having a piston crown 112 provided with a combustion bowl 112a, as well as a circumferential top land 113 and a circumferential ring belt 114 having ring grooves 115a, 115b, 115c. Piston head 111 is furthermore connected, in known manner, with pin bosses (not shown), by way of pin boss connections 116, which pin bosses have pin boss bores 117 for accommodating a piston pin, not shown. Piston 110 furthermore, in known manner, has a piston skirt having working surfaces (not shown). In the case of the exemplary embodiment, piston head 111 is also made from a known aluminum alloy, for example an aluminum/silicon alloy of the type MAHLE M142 or MAHLE M174.

In the exemplary embodiment, a ring insert 121 is provided directly below top land 113. Ring insert 121 consists of a ring insert part 124 and a cooling channel part 125. Ring groove 115a that lies directly adjacent to top land 113 is worked into ring insert part 124. Ring insert part 124 and cooling channel part 125 are welded to one another, in known manner (cf. DE 197 50 012 A1). Surface 126 of ring insert part 124 that radially faces the cooling channel part 125 and cooling channel part 125 enclose a cooling channel 127.

Cooling channel part 125 generally consists of a steel sheet metal, for example of a V2A steel sheet metal. Ring insert part 124 generally consists of a NiResist material, in other words an austenitic cast iron material with lamellar graphite. Ring insert part 124 is alfinated, i.e., provided with a so-called Alfin layer, consisting of iron aluminides, along its surface that faces piston head 111. The Alfin layer serves as a bonding layer 122 between ring insert part 124 and piston head 111.

To relieve stress on bonding layer 122, a circumferential depression 123 is worked into top land 113. Circumferential depression 123 is configured approximately in V shape in cross-section, and has a rounded bottom. However, circumferential depression 123 can also be configured in a parabola or hyperbola shape. In the exemplary embodiment, circumferential depression 123 has a depth (t) of about 1 mm, as well as an opening angle (a) of about 20°. In the exemplary embodiment, the distance (d) between the circumferential depression 123 and ring insert part 124 of ring insert 121 is about 1 mm.

With the present invention, a piston 10, 110 that is easy to produce and therefore can be used in series production is proposed, in which bonding layer 22, 122 between ring insert 21, 121 and piston head 11, 111 is relieved of tensile stresses, so that the risk of tearing of bonding layer 22, 122 is significantly reduced.

Accordingly, while only a few embodiments of the present invention have been shown and described, it is obvious that many changes and modifications may be made thereunto without departing from the spirit and scope of the invention.

What is claimed is:

1. A piston for an internal combustion engine, comprising:
   a piston head having
   a piston crown;
   a circumferential top land; and
   a circumferential ring belt having ring grooves, at least one of said ring grooves being provided with a ring insert,
   wherein a circumferential depression is provided in the top land above the ring belt.

2. A piston according to claim 1, wherein the circumferential depression has a depth (t) of up to 1 mm.

3. A piston according to claim 1, wherein the circumferential depression has a cross section that is V-shaped or parabolic or hyperbolic in shape.

4. A piston according to claim 3, wherein an opening angle (a) of the depression amounts to up to 20°.

5. A piston according to claim 3, wherein the circumferential depression is V-shaped in cross-section and has a rounded bottom.

6. A piston according to claim 1, wherein a ring groove that lies directly adjacent to the top land is provided with a ring insert.

7. A piston according to claim 6, wherein a distance (d) between the circumferential depression and the ring insert amounts to at least 1 mm.

8. A piston according to claim 1, wherein at least the piston head is produced from a light-metal alloy.

9. A piston according to claim 8, wherein at least the piston head is produced from an Al alloy of the type MAHLE M142 or MAHLE M174.

10. A piston according to claim 1, wherein the ring insert is produced from a NiResist material.

11. A piston according to claim 1, wherein the ring insert has a ring insert part and a cooling channel part.

* * * * *